UNITED STATES PATENT OFFICE.

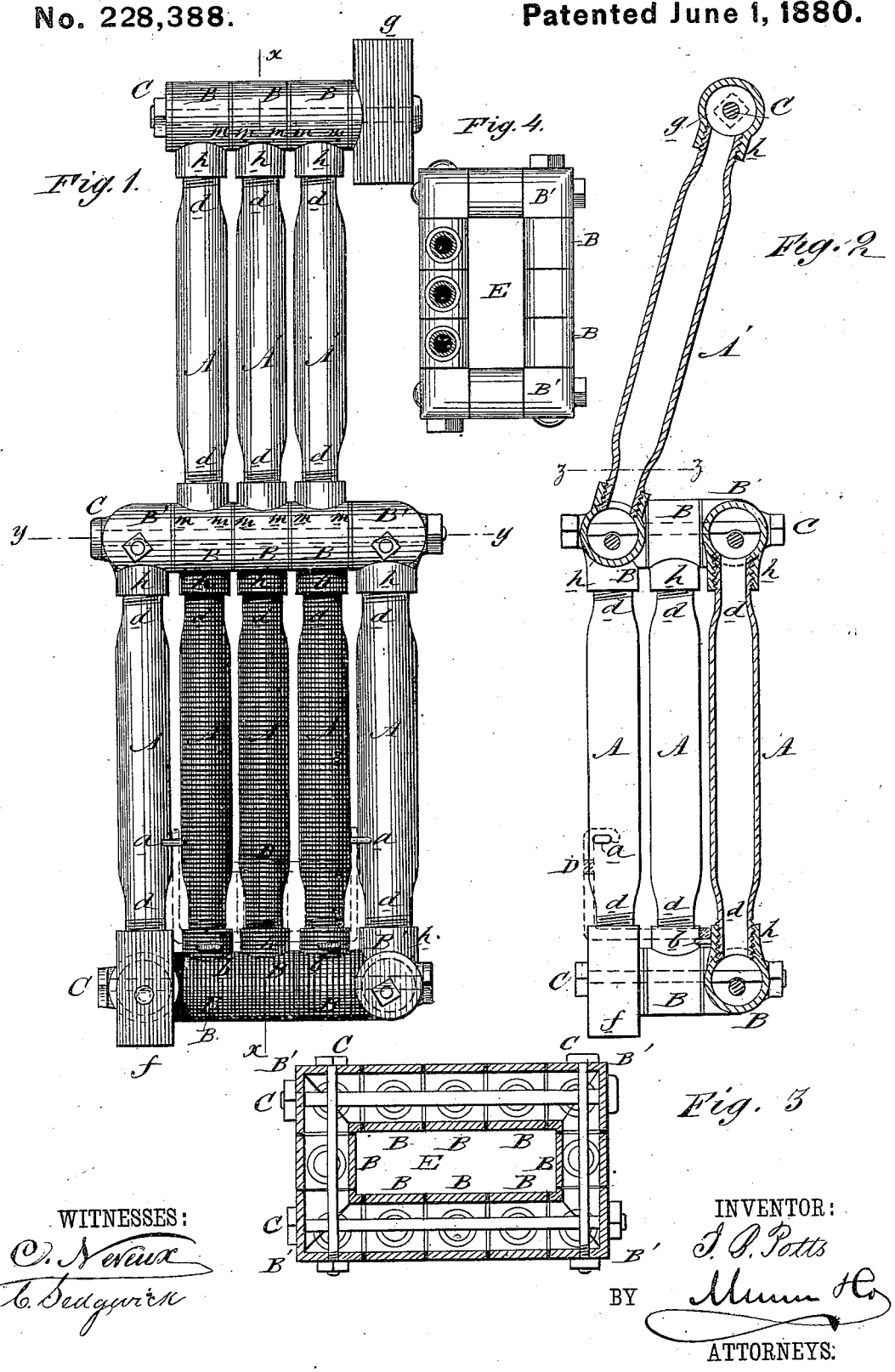

ISAAC B. POTTS, OF COLUMBUS, OHIO.

FIRE-PLACE WATER-HEATER.

SPECIFICATION forming part of Letters Patent No. 228,388, dated June 1, 1880.

Application filed February 10, 1880.

*To all whom it may concern:*

Be it known that I, ISAAC B. POTTS, of Columbus, in the county of Franklin and State of Ohio, have invented a new and Improved Fire-Place Water-Heater or Steam-Generator, of which the following is a specification.

Figure 1 is a front elevation of the heater or generator. Fig. 2 is a sectional side elevation of the same on line $x$ $x$, Fig. 1. Fig. 3 is a transverse section of the same on line $y$ $y$, Fig. 1. Fig. 4 is a horizontal section through $z$ $z$ of Fig. 2.

Similar letters of reference indicate corresponding parts.

The object of this invention is to provide an improved heater or steam-generator for open-grate fire-places.

In the drawings, A A' represent the vertical pipes of the heater or generator, connected with each other by couplings B B' and bolts and nuts C.

A grate, D, (shown in dotted lines,) is suspended at the points $a$ $a$ and rests on the supports $b$ $b$.

In ordinary water-heating and steam-generating devices that are composed wholly or in part of pipes the diameters of the couplings or joints are greater than the diameters of the pipes coupled; hence the said pipes cannot be set closely together.

The pipes A A', however, herein shown, are reduced at their ends both in internal and external diameters, as shown at $d$ $d$, so that smaller couplings or joints may be used, (of the same diameters, if desirable, as the pipes,) and thereby the said pipes be set nearer together than is possible with pipes of equal diameters throughout. The inlet for the water into the said pipes is at $f$ and the outlet at $g$, which inlet and outlet may be fitted with suitable valves.

The manner of connecting these pipes A A' with each other is clearly shown in Figs. 2 and 3, wherein it is seen that the ends of the said pipes are screwed into the legs $h$ of the couplings B B', while the arms $m$ of the said couplings are held connected with each other, so as to form continuous tubes, by the bolts C, which pass centrally through them, and are provided with nuts on their ends.

It is designed that this heater or steam-generator shall be placed in an open fire-place, with its pipes A A forming or lining the back and sides of the fire-place, and with its upward-inclined pipes A' A' forming or lining the lower slope of the chimney-flue, the space E being the throat of the chimney.

The angle or elbow couplings B' are especially designed for forming the rectangular corners of the device, so that said device may be fitted more easily and closely in an ordinary fire-place.

Having thus described my invention, I claim as new and desire to secure by Letters Patent—

A steam-heater for fire-places, consisting of the vertical pipes A A', bolted together, connected by elbow-couplings B B', having arms $m$, and provided with water inlet and outlet $f$ $g$, to adapt it to be used as described.

ISAAC BROADWORTH POTTS.

Witnesses:
 JASON W. FIRESTONE,
 LORENZO ENGLISH.